US008074121B2

(12) United States Patent
Biazetti et al.

(10) Patent No.: US 8,074,121 B2
(45) Date of Patent: Dec. 6, 2011

(54) AUTOMATED INFORMATION TECHNOLOGY ERROR AND SERVICE REQUEST CORRELATION

(75) Inventors: Ana C. Biazetti, Cary, NC (US); Micah M. Cross, Creedmoor, NC (US)

(73) Assignee: International Business Machines Corporation, Armonk, NY (US)

( * ) Notice: Subject to any disclaimer, the term of this patent is extended or adjusted under 35 U.S.C. 154(b) by 42 days.

(21) Appl. No.: 12/634,117

(22) Filed: Dec. 9, 2009

(65) Prior Publication Data

US 2011/0138234 A1 Jun. 9, 2011

(51) Int. Cl.
G06F 11/00 (2006.01)

(52) U.S. Cl. ............................ 714/49; 714/37

(58) Field of Classification Search .................. 714/37, 714/49

See application file for complete search history.

(56) References Cited

U.S. PATENT DOCUMENTS

| | | | |
|---|---|---|---|
| 6,173,420 B1 * | 1/2001 | Sunkara et al. | 714/38.14 |
| 6,178,438 B1 | 1/2001 | Tschirhart et al. | |
| 6,240,511 B1 * | 5/2001 | Blumenau et al. | 713/1 |
| 6,804,798 B2 | 10/2004 | Guha et al. | 714/49 |
| 6,883,120 B1 * | 4/2005 | Banga | 714/47.1 |
| 7,065,767 B2 * | 6/2006 | Kambhammettu et al. | 719/310 |
| 7,373,556 B2 * | 5/2008 | Srivastava et al. | 714/47.1 |
| 2003/0028825 A1 * | 2/2003 | Hines | 714/37 |
| 2005/0120101 A1 * | 6/2005 | Nocera | 709/223 |
| 2007/0043674 A1 | 2/2007 | DiFalco et al. | |
| 2009/0183143 A1 | 7/2009 | Li et al. | |

FOREIGN PATENT DOCUMENTS

WO 2000042513 A1 7/2000

OTHER PUBLICATIONS

Author Unknown, Working with Tickets, Chapter 15: Cisco Active Network Abstraction User Guide, 3.6.6, Webpage/site: http://www.cisco.com/en/US/docs/net_mgmt/active_network_abstraction/3.6.6/user/guide/tickets.html#wp1041678, 2009, pp. 15-1 to 15-20, Cisco Systems, Inc., Published on the World Wide Web.

Author Unknown, Service Trace Viewer Tool (SvcTraceViewer.exe), Webpage/site: http://msdn.microsoft.com/en-us/library/ms732023(printer).aspx, Printed from Website Oct. 28, 2009, pp. 1-14, Microsoft Corporation, Published on the World Wide Web.

* cited by examiner

Primary Examiner — Joshua Lohn
(74) Attorney, Agent, or Firm — Lee Law, PLLC; Christopher B. Lee (57) ABSTRACT

An implementation verification policy for each of a set of change management tasks associated with one of a set of service requests within an information technology (IT) environment is created via a configuration management device. Each of the set of change management tasks is automatically implemented. An error associated with the automated implementation of one of the set of change management tasks is detected based on the implementation verification policy created for one of the set of change management tasks. The error is automatically correlated with a service request that caused the error.

24 Claims, 5 Drawing Sheets

AUTOMATED INFORMATION TECHNOLOGY ERROR AND SERVICE REQUEST CORRELATION

BACKGROUND

The present invention relates to information technology changes. More particularly, the present invention relates to automated information technology error and service request correlation.

Information technology (IT) environments include various management processes to handle different aspects of operation. These processes include service request management, change management, release management, and deployment management.

BRIEF SUMMARY

A method includes creating, via a configuration management device, an implementation verification policy for each of a plurality of change management tasks associated with one of a plurality of service requests within an information technology (IT) environment; automatically implementing each of the plurality of change management tasks; detecting an error associated with the automated implementation of one of the plurality of change management tasks based on the implementation verification policy created for the one of the plurality of change management tasks; and automatically correlating the error with a service request that caused the error.

A system includes a memory for storing automated implementation information; and a processor programmed to: create an implementation verification policy for each of a plurality of change management tasks associated with one of a plurality of service requests within an information technology (IT) environment; store the implementation verification policy to the memory; automatically implement each of the plurality of change management tasks; detect an error associated with the automated implementation of one of the plurality of change management tasks based on the implementation verification policy created for the one of the plurality of change management tasks; and automatically correlate the error with a service request that caused the error.

A computer program product includes a computer readable storage medium including a computer readable program code, where the computer readable program code when executed on a computer causes the computer to: create an implementation verification policy for each of a plurality of change management tasks associated with one of a plurality of service requests within an information technology (IT) environment; automatically implement each of the plurality of change management tasks; detect an error associated with the automated implementation of one of the plurality of change management tasks based on the implementation verification policy created for the one of the plurality of change management tasks; and automatically correlate the error with a service request that caused the error.

DETAILED DESCRIPTION

The examples set forth below represent the necessary information to enable those skilled in the art to practice the invention and illustrate the best mode of practicing the invention. Upon reading the following description in light of the accompanying drawing figures, those skilled in the art will understand the concepts of the invention and will recognize applications of these concepts not particularly addressed herein. It should be understood that these concepts and applications fall within the scope of the disclosure and the accompanying claims.

The subject matter described herein provides automated information technology error and service request correlation. For each service request within an information technology (IT) environment, the service request is processed via a Service Request Management (SRM) process of analysis, recovery of service, and problem management to determine and correct the root cause. Both the remediation as well as the problem resolution may be governed by a change process, within which the service request is automatically partitioned into change management tasks. An implementation verification policy is created for each change management task. Each change management task is automatically implemented. Errors that result from the automated implementation of a change management task may be detected based on the associated implementation verification policy. Errors are automatically correlated with the service request that caused the error. Examples of lower-level automated tasks include tasks to install software, install software patches, restart systems, and other tasks. It is additionally noted that certain tasks may not provide immediate feedback of error conditions.

The present subject matter has been devised in response to a recognition that a majority of downtime in IT environments is caused by changes to the IT environment. Further, as a result, tracking of changes within an IT environment by IT Service Management (ITSM) processes has recently increased in importance. Errors may occur during the actual lower-level automated tasks that install software, that install software patches, and restart systems, and these errors may be tracked using the present subject matter. The present subject matter addresses these issues. It is further noted that the actual implementation of these tasks is often not immediate. As such, the present subject matter provides for identification and tracking of latent errors and problems with automated implementation of changes. The present subject matter further addresses situations where a change is reverted after the change is made, by some user computer or program outside of the control of the change process, which may cause the entire change to be ineffective. By tracking changes and correlating those changes with original service requests, reverted changes may also be tracked. As such, the present subject matter provides for coordinating the implementation of a service request by correlating error tickets for all changes and resolves any errors until the change is completed. As errors occur in the implementation of service requests, they are automatically detected and correlated with the parent tickets, facilitating their resolution within a comprehensive error resolution context.

The implementation verification policy may further have a verification timeframe associated with it to allow for a configured duration to be defined for monitoring of latent errors associated with each change management task that is automatically implemented. As such, the implementation verification policy provides for ongoing monitoring of automatically implemented change management tasks to identify latent errors in addition to immediate errors at the time of deployment. It should additionally be noted that certain changes may be reverted, and that this reversion may cause additional errors. These latent errors and reversion errors may cause additional errors and changes to correct these additional errors may be automatically implemented in a recursive manner until all errors are resolved. Accordingly, the implementation verification policies provide for compliance checking in association with automated implementation of change management tasks.

Further, an error report ticket and a child change management task may be automatically created in response to the detected error. The automatically implemented change management task that caused the error may be considered a parent change management task of the automatically created child change management task. This processing may continue recursively to implement additional error report tickets and child change management tasks in response to any additional errors that may occur during the automated implementation of the change management tasks. Processing continues until all errors are resolved.

Correlation of the change management tasks and child change management tasks with the original service request that caused the error may be facilitated via a change correlation identifier that identifies the service request with which each change management task is associated. The automated correlation of an error with the service request that caused the error may include automatically correlating the error with the service request that caused the error using the associated change correlation identifier. This processing may be performed at each level of hierarchical processing for creation and automated deployment of child change management tasks. As such, errors generated at any level of hierarchical child change management task processing may be correlated with the level above and resolved to the original service request that caused the error. By correlation of the automated implementation error with the service request that caused the error, service request processing may be improved.

The automated processing created for each task may be processed in response to an error in the automated deployment of a change management task to determine whether the error was caused by the automated implementation of the change management task. Additional child error tickets may be created and processing for automated implementation may be changed in response to such a determination to improve automated implementation and deployment over time.

In addition to automated implementation of change management tasks and error correlation with original service requests, the subject matter described herein may further verify proper automated implementation of change management tasks using the implementation verification policy created for change management tasks. In response to verification of proper automated implementation, an indication may be provided that the change management tasks have been automatically implemented successfully.

To facilitate determination of success or error with automated implementation of change management tasks, the automated implementation of each change management task may be monitored. Detection of the error associated with the automated implementation of a change management task may further be based upon identifying a violation of the associated implementation verification policy. Monitoring the automated implementation of each change management task may further include monitoring the automated implementation of each change management task for immediate implementation errors. Monitoring the automated implementation of each change management task may further include monitoring the automated implementation of each change management task for latent implementation errors.

Further regarding child change management tasks, a child implementation verification policy may be created for each child change management task. Child change management tasks may also be automatically implemented and monitored similarly to the monitoring of the parent change management task. A child correlation identifier may be associated with the child change management task that identifies the parent change management task. Errors associated with the automated implementation of the child change management tasks may be detected based on the child implementation verification policy. The child task implementation error may further be automatically correlated with the service request that caused the child task implementation error.

The automated correlation of child implementation errors with parent implementation errors and with the original service request may be implemented using a child correlation identifier and a parent correlation identifier that associates the parent change management task with the service request. As such, the child implementation verification policy may provide for compliance checking for automatically created child change implementation tasks, where child error tickets go through their own ticket/change management process, but with the addition of contextual information traceable to the original service request. This cycle may be repeated multiple times until all automated implementations have been completed without residual errors, and all child error tickets and all correlated parent tickets may be closed.

As such, the implementation verification policy may be used to identify both immediate and latent implementation errors associated with the automated implementation of change management tasks. In such an implementation, detecting the error associated with the automated implementation of a change management task based on the implementation verification policy may include detecting a latent implementation error associated with the automated implementation of a change management task.

It should further be noted that implementation verification policy checking may be performed based on a schedule or performed periodically, randomly, or at any interval appropriate for a given implementation without departure from the scope of the present subject matter. As such, the present subject matter provides for configurable scheduling of implementation policy compliance checking activities.

It should further be noted that, while certain examples below include a single module or process for ease of illustration purposes, multiple modules or processes may be used as appropriate for a given implementation. For example, the automated implementation of change management tasks may be implemented by a change implementation module. Further, policy verification and compliance monitoring may be implemented by a policy verification module. Ticket association with parent change management tasks and service requests may be managed by a ticket correlation module. Many other variations on process and module partitioning are possible and all are considered within the scope of the present subject matter.

The automated information technology error and service request correlation described herein may further be used to determine that a child change management task corrected an error based upon the child implementation verification policy. In response to automated resolution of the error, an indication may be provided that the error detected in association a change management task, and thereby with a service request, has been automatically corrected.

The automated information technology error and service request correlation described herein may be performed in real time to allow prompt automated identification of service requests that resulted in errors within an IT environment. For purposes of the present description, real time shall include any time frame of sufficiently short duration as to provide reasonable response time for information processing acceptable to a user of the subject matter described. Additionally, the term "real time" shall include what is commonly termed "near real time"—generally meaning any time frame of sufficiently short duration as to provide reasonable response time for on-demand information processing acceptable to a user of the subject matter described (e.g., within a portion of a second or within a few seconds). These terms, while difficult to precisely define are well understood by those skilled in the art.

Figure 1:
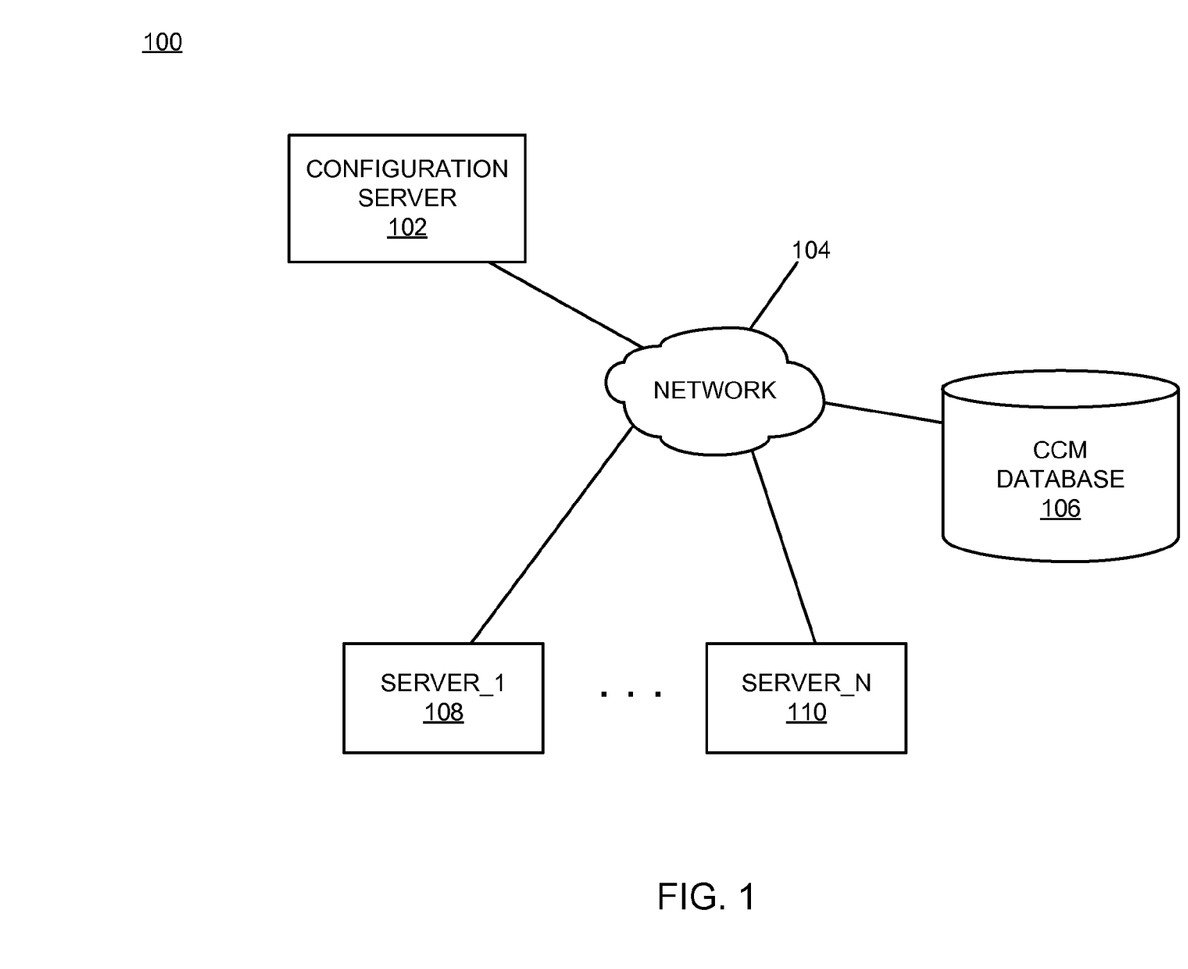
FIG. 1 is a block diagram of an example of an implementation of a system for automated information technology error and service request correlation according to an embodiment of the present subject matter.

FIG. 1 is a block diagram of an example of an implementation of a system 100 for automated information technology error and service request correlation. A configuration server 102 communicates via a network 104 to access a Change Configuration Management (CCM) database 106. The CCM database 106 stores information, as described herein, for change and configuration management tasks for devices, such as a server_1 108 through a server_N 110. It is understood that other devices may be managed by the configuration server 102 without departure from the scope of the present subject matter.

As will be described in more detail below in association with FIGS. 2 through 4B, the configuration server 102 provides automated information technology error and service request correlation. The automated information technology error and service request correlation is based upon associations created for each service request managed by the configuration server 102, as described in more detail below. The automated information technology error and service request correlation provides correlation of errors and error causes with original service requests. This correlation is provided by maintaining information associated with each change configuration task that is automatically implemented by the configuration server for each device, such as one of the server_1 108 through the server_N 110, and for each child error ticket and child change management task.

It should be noted that the configuration server 102 may be a portable computing device without departure from the scope of the present subject matter. It should also be noted that the configuration server 102 may be any computing device capable of processing information as described above and in more detail below. For example, the configuration server 102 may include devices such as a personal computer (e.g., desktop, laptop, palm, etc.) or a handheld device (e.g., cellular telephone, personal digital assistant (PDA), email device, music recording or playback device, etc.), or any other device capable of processing information as described in more detail below.

The network 104 may include any form of interconnection suitable for the intended purpose, including a private or public network such as an intranet or the Internet, respectively, direct inter-module interconnection, dial-up, wireless, or any other interconnection mechanism capable of interconnecting the respective devices.

Figure 2:
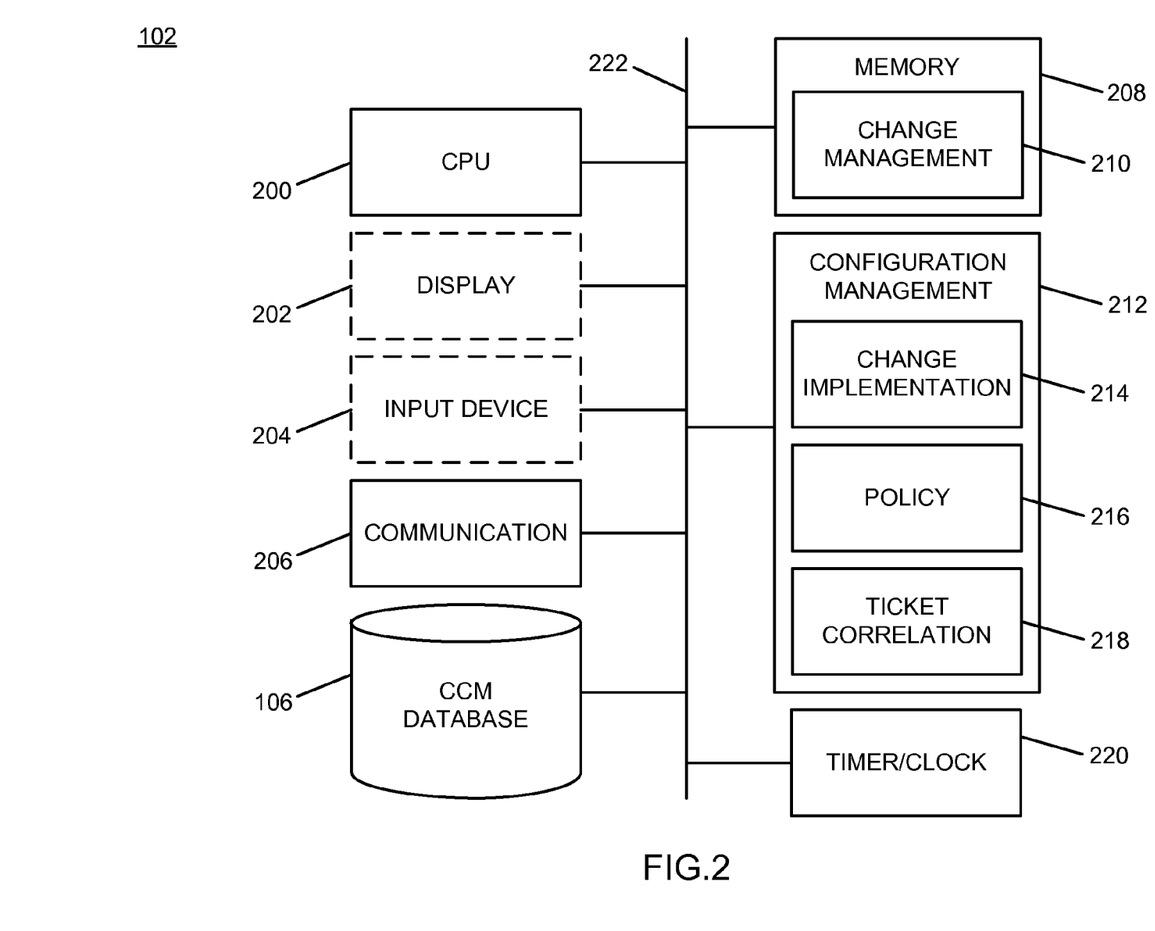
FIG. 2 is a block diagram of an example of an implementation of a configuration server that is capable of performing automated information technology error and service request correlation according to an embodiment of the present subject matter.

FIG. 2 is a block diagram of an example of an implementation of the configuration server 102 that is capable of performing automated information technology error and service request correlation. A central processing unit (CPU) 200 provides computer instruction execution, computation, and other capabilities within the configuration server 102. A display 202 provides visual information to a user of the configuration server 102 and an input device 204 provides input capabilities for the user.

The display 202 may include any display device, such as a cathode ray tube (CRT), liquid crystal display (LCD), light emitting diode (LED), projection, touchscreen, or other display element or panel. The input device 204 may include a computer keyboard, a keypad, a mouse, a pen, a joystick, or any other type of input device by which the user may interact with and respond to information on the display 202.

It should be noted that the display 202 and the input device 204 are illustrated with a dashed-line representation within FIG. 2 to indicate that they may be optional components for the configuration server 102 for certain implementations. Accordingly, the configuration server 102 may operate as a completely automated embedded device without user configurability or feedback. However, the configuration server 102 may also provide user feedback and configurability via the display 202 and the input device 204, respectively.

A communication module 206 provides interconnection capabilities that allow the configuration server 102 to communicate with other modules within the system 100, such as the server_1 108 through the server_N 110, to coordinate and manage service requests within the system 100. The communication module 206 may include any electrical, protocol, and protocol conversion capabilities useable to provide the interconnection capabilities. Though the communication module 206 is illustrated as a component-level module for ease of illustration and description purposes, it should be noted that the communication module 206 may include any hardware, programmed processor(s), and memory used to carry out the functions of the communication module 206 as described above and in more detail below. For example, the communication module 206 may include additional controller circuitry in the form of application specific integrated circuits (ASICs), processors, antennas, and/or discrete integrated circuits and components for performing communication and electrical control activities associated with the communication module 206. Additionally, the communication module 206 may include interrupt-level, stack-level, and application-level modules as appropriate. Furthermore, the communication module 206 may include any memory components used for storage, execution, and data processing for performing processing activities associated with the communication module 206. The communication module 206 may also form a portion of other circuitry described without departure from the scope of the present subject matter.

A memory 208 includes a change management storage area 210 that stores information associated with configuration change management for the configuration server 102. As will be described in more detail below, information stored within the change management storage area 210 is used to coordinate activities associated with automated implementation of change management and child change management tasks, error detection and error cause determination, and generation of and management of child error tickets and associated processing to correlate implementation errors with original service requests.

It is understood that the memory 208 may include any combination of volatile and non-volatile memory suitable for the intended purpose, distributed or localized as appropriate, and may include other memory segments not illustrated within the present example for ease of illustration purposes. For example, the memory 208 may include a code storage area, a code execution area, and a data area without departure from the scope of the present subject matter.

A configuration management module 212 is also illustrated. The configuration management module 212 provides configuration management, implementation verification policy implementation, automated task implementation monitoring and other processing for the configuration server 102, as described above and in more detail below. The configuration management module 212 implements the automated information technology error and service request correlation of the configuration server 102.

The configuration management module 212 further includes a change implementation management sub-module 214, a policy management sub-module 216, and a ticket correlation management sub-module 218. The change implementation management sub-module 214 performs automated change management task partitioning for received service requests, automated implementation of partitioned tasks, and processing for detection of immediate errors associated with the automated implementation of change management tasks. The change implementation management sub-module 214 module notifies the policy management sub-module 216 of implemented change configuration tasks. The change implementation management sub-module 214 also iteratively and recursively creates child error tickets and child configuration management tasks for either immediate or latent errors. The change implementation management sub-module 214 also notifies the ticket correlation management sub-module 218 of all error tickets created for ticket and process management and reporting.

The policy management sub-module 216 creates and monitors implementation verification policies for implemented change management tasks identified by the change implementation management sub-module 214 for latent errors and for compliance of automatically implemented changes over time. The policy management sub-module 216 notifies the change implementation management sub-module 214 of any latent errors for creation of child error tickets and automated implementation of child change configuration tasks.

The ticket correlation management sub-module 218 creates change correlation identifiers for all automated change management tasks and each level of task implementation hierarchy for each service request, manages child error tickets, and provides the change implementation management module 214 with change correlation identifiers for association with each automatically implemented change management task.

Though the configuration management module 212 is illustrated as a component-level module with certain sub-modules illustrated for ease of illustration and description purposes, it should be noted that the configuration management module 212 may include any hardware, programmed processor(s), and memory used to carry out the functions of this module as described above and in more detail below. For example, the configuration management module 212 may include additional controller circuitry in the form of application specific integrated circuits (ASICs), processors, and/or discrete integrated circuits and components for performing communication and electrical control activities associated with the respective devices. Additionally, the configuration management module 212 may also include interrupt-level, stack-level, and application-level modules as appropriate. Furthermore, the configuration management module 212 may include any memory components used for storage, execution, and data processing for performing processing activities associated with the module.

It should also be noted that the configuration management module 212 may form a portion of other circuitry described without departure from the scope of the present subject matter. Further, the configuration management module 212 may alternatively be implemented as an application stored within the memory 208. In such an implementation, the configuration management module 212 may include instructions executed by the CPU 200 for performing the functionality described herein. The CPU 200 may execute these instructions to provide the processing capabilities described above and in more detail below for the configuration server 102. The configuration management module 212 may form a portion of an interrupt service routine (ISR), a portion of an operating system, a portion of a browser application, or a portion of a separate application without departure from the scope of the present subject matter. Further, the change implementation management sub-module 214, the policy management sub-module 216, and the ticket correlation management sub-module 218 may form one or more processes in association with any such application.

A timer/clock module 220 is illustrated and used to determine timing and date information, such as for a timeframe associated with an implementation verification policy, as described above and in more detail below. As such, the configuration management module 212 may utilize information derived from the timer/clock module 220 for information processing activities, such as the automated information technology error and service request correlation described herein.

The CCM database 106 is also shown associated with the configuration server 102 in FIG. 2 to illustrate that the CCM database 106 may be implemented locally to the configuration server 102. The CCM database 106 provides storage capabilities for information associated with the automated information technology error and service request correlation of the configuration server 102. The CCM database 106 includes storage for configuration change management information, such as error and child error tickets, error reports, and other related information. The configuration change management information stored within the CCM database 106 may be stored in the form of tables or other arrangements accessible by the configuration server 102.

The CPU 200, the display 202, the input device 204, the communication module 206, the memory 208, the configuration management module 212, the timer/clock module 220, and the CCM database 106 are interconnected via an interconnection 222. The interconnection 222 may include a system bus, a network, or any other interconnection capable of providing the respective components with suitable interconnection for the respective purpose.

While the configuration server 102 is illustrated with and has certain components described, other modules and components may be associated with the configuration server 102 without departure from the scope of the present subject matter. Additionally, it should be noted that, while the configuration server 102 is described as a single device for ease of illustration purposes, the components within the configuration server 102 may be co-located or distributed and interconnected via a network without departure from the scope of the present subject matter. For a distributed arrangement, the display 202 and the input device 204 may be located at an operator terminal, kiosk, or other location, while the CPU 200 and memory 208 may be located at a local or remote server. Many other possible arrangements for components of the configuration server 102 are possible and all are considered within the scope of the present subject matter. It should also be understood that, though the CCM database 106 is shown as a separate component, the associated information may also be stored within the memory 208 without departure from the scope of the present subject matter. Accordingly, the configuration server 102 may take many forms and may be associated with many platforms.

Figure 3:
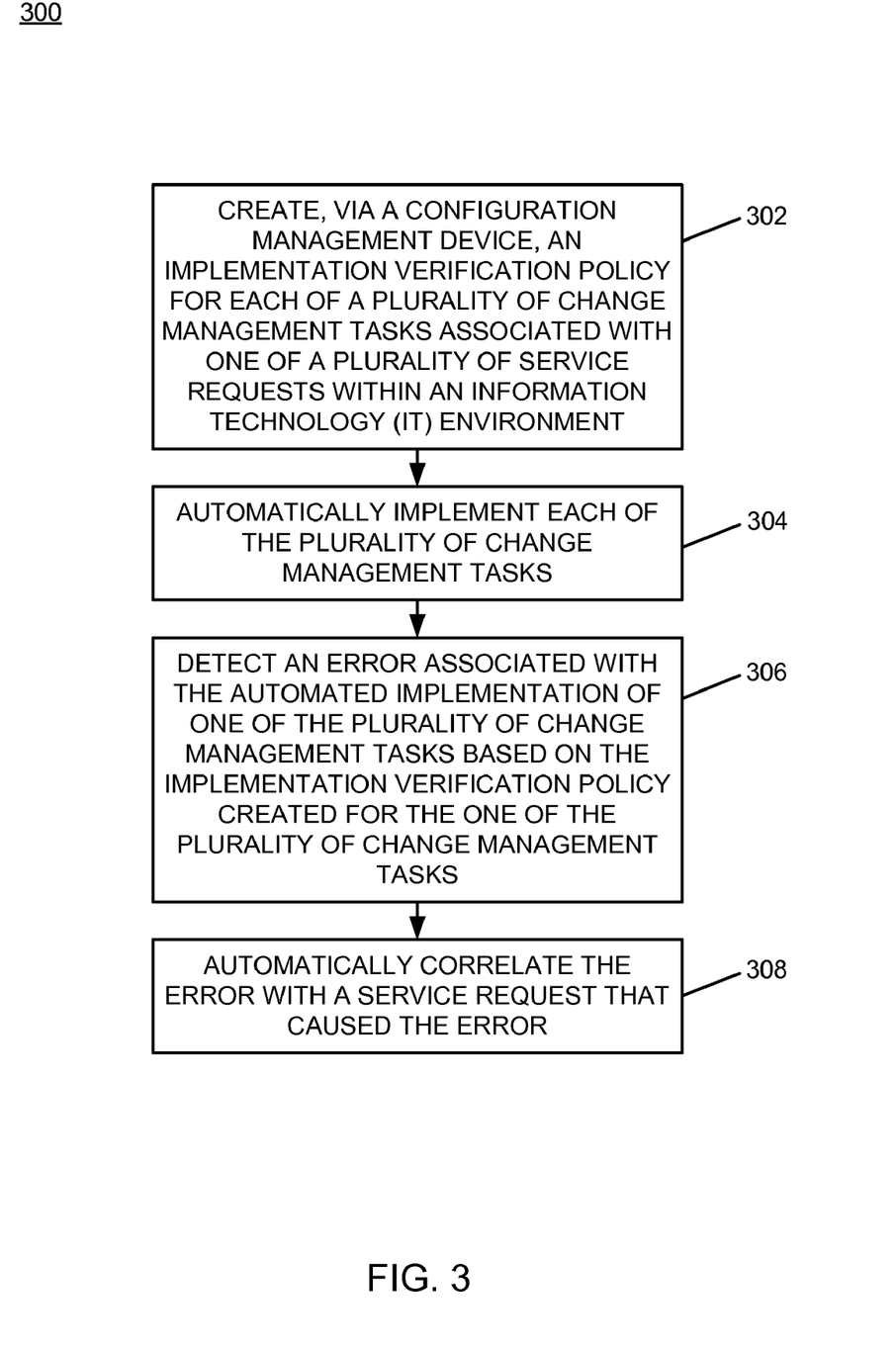
FIG. 3 is a flow chart of an example of an implementation of a process for automated information technology error and service request correlation according to an embodiment of the present subject matter.
Figure 4A:
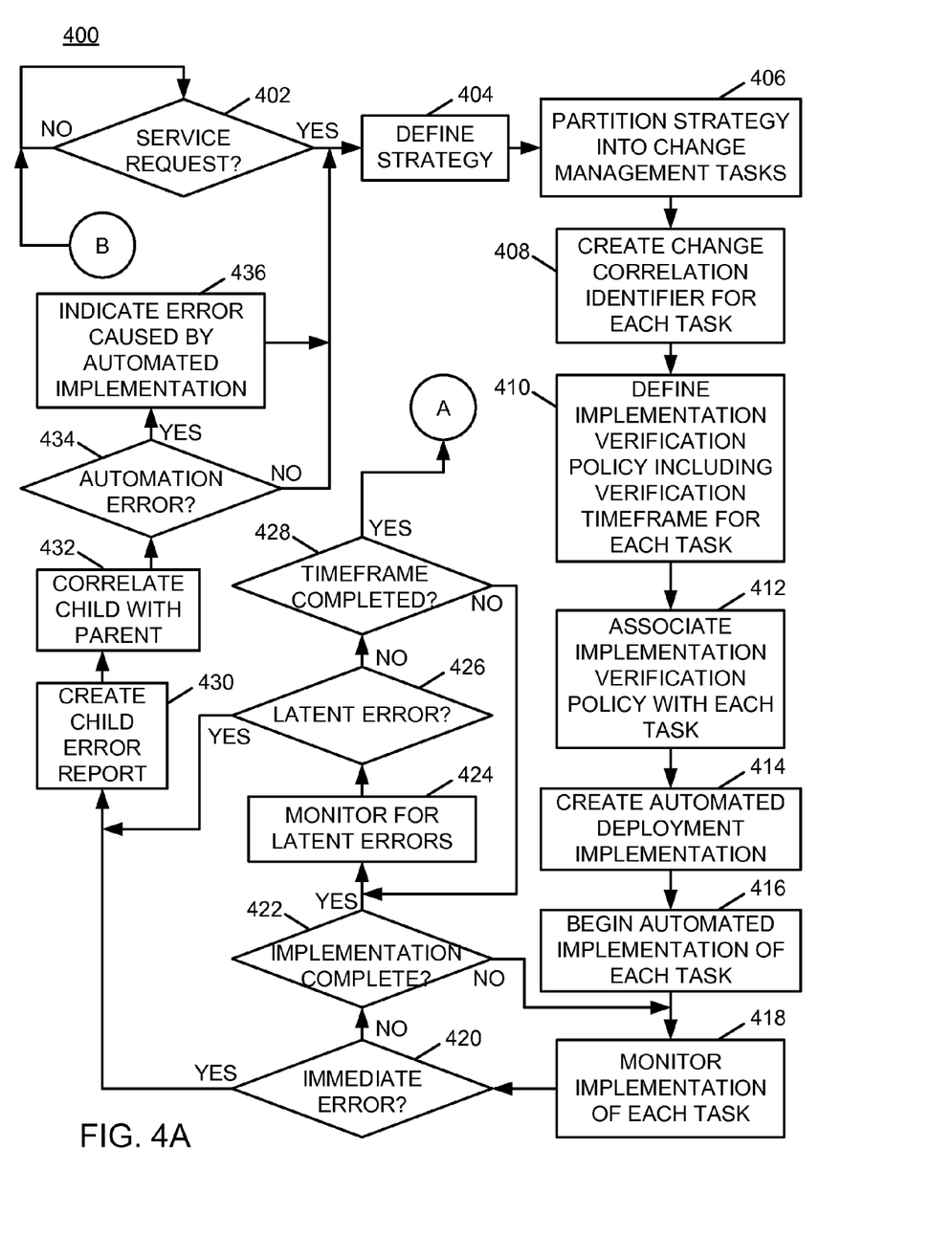
FIG. 4A is a flow chart of an example of an implementation of initial processing of a process for automated processing of service requests for information technology error and service request correlation according to an embodiment of the present subject matter.
Figure 4B:
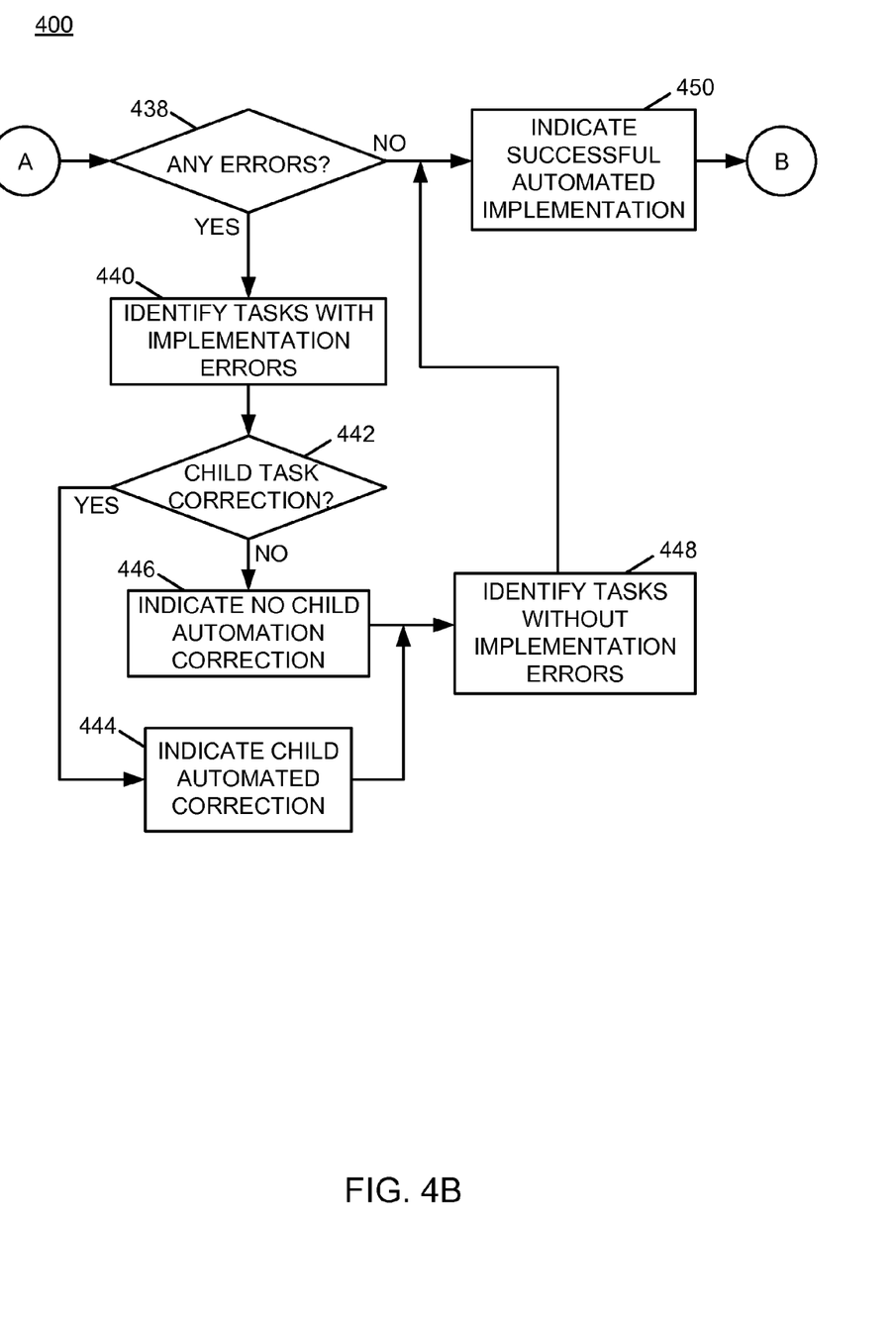
FIG. 4B is a flow chart of an example of an implementation of additional processing of a process for automated processing of service requests for information technology error and service request correlation according to an embodiment of the present subject matter.

FIG. 3 through FIG. 4B below describe example processes that may be executed by devices, such as the configuration server 102, to perform the automated information technology error and service request correlation associated with the present subject matter. Many other variations on the example processes are possible and all are considered within the scope of the present subject matter. The example processes may be performed by modules, such as the configuration management module 212 and/or executed by the CPU 200, associated with such devices. Further, the example processes may be partitioned and implemented by the change implementation management sub-module 214, the policy management sub-module 216, and the ticket correlation management sub-module 218 without departure from the scope of the present subject matter. It should be noted that time out procedures and other error control procedures are not illustrated within the example processes described below for ease of illustration purposes. However, it is understood that all such procedures are considered to be within the scope of the present subject matter.

FIG. 3 is a flow chart of an example of an implementation of a process 300 for automated information technology error and service request correlation. At block 302, the process 300 creates, via a configuration management device, an implementation verification policy for each of a plurality of change management tasks associated with one of a plurality of service requests within an information technology (IT) environment. At block 304, the process 300 automatically implements each of the plurality of change management tasks. At block 306, the process 300 detects an error associated with the automated implementation of one of the plurality of change management tasks based on the implementation verification policy created for the one of the plurality of change management tasks. At block 308, the process 300 automatically correlates the error with a service request that caused the error.

FIGS. 4A-4B illustrate a flow chart of an example of an implementation of a process 400 for automated processing of service requests for information technology error and service request correlation. FIG. 4A illustrates initial processing within the process 400. At decision point 402, the process 400 makes a determination as to whether a service request has been received. When a determination is made that a service request has been received, the process 400 defines a strategy for the service request at block 404. The defined strategy may include an automated implementation strategy for service requests that are initially received. As described in more detail below, the strategy defined at block 404 may also include an automated implementation strategy for errors that occur during automated implementation of change management tasks associated with service requests during subsequent iterations of processing at block 404.

At block 406, the process 400 partitions the defined strategy into change management tasks. At block 408, the process 400 creates a change correlation identifier for each change management task created. The process 400 further associates the created change correlation identifier with each change management task. The change correlation identifier identifies the particular service request with which each change management task is associated. As described above and in more detail below, the change correlation identifier may be used when errors are detected to correlate the detected errors with the original service request. Additionally, as described in more detail below, when errors are detected, child error tickets and child change management tasks are created. Additional change correlation identifiers may be created for each hierarchical level of error processing and automated implementation of child change management task to allow correlation of errors with original service requests.

At block 410, the process 400 defines an implementation verification policy including a verification timeframe for each task. The implementation verification policy may include compliance requirements for automated implementation of change management tasks and for verification of service request implementation compliance. The verification timeframe associated with each task may be based upon a configured verification duration sufficient to allow detection of compliance issues for latent errors that may not occur immediately upon automated implementation of change management tasks. At block 412, the process 400 associates each implementation verification policy with each associated change management task.

At block 414, the process 400 creates an automated deployment implementation. The automated deployment implementation defines any sequences or other processing criteria associated with the respective change management task. At block 416, the process 400 begins automated implementation of each change management task. The automated implementation of each change management task may be based upon the automated deployment implementation described above.

At block 418, the process 400 begins monitoring the automated implementation of each change management task. At decision point 420, the process 400 makes a determination as to whether an immediate error associated with the automated implementation of a change management task has been detected based upon the implementation verification policy created for the respective change management task. As such, the process 400 may identify a violation of the associated implementation verification policy.

Processing associated with an affirmative determination of an error at decision point 420 will be deferred and described in detail below. When a determination is made at decision point 420 that an immediate error has not been detected, the process 400 makes a determination at decision point 422 as to whether the automated implementation has been completed. When a determination is made that the automated implementation has not been completed, the process 400 returns to block 418 and continues monitoring implementation of each task and iterates as described above.

When a determination is made at decision point 422 that the automated implementation has been completed, the process 400 begins monitoring for latent errors at block 424. As such, the process 400 monitors the automated implementation of each change management task for latent implementation errors, again based upon the implementation verification policy. At decision point 426, the process 400 makes a determination as to whether a latent error has been detected in association with the automated implementation of any change management task based upon the implementation policy created for each change management task.

When a determination is made that no latent error has been detected at decision point 426, the process 400 makes a determination at decision point 428 as to whether the verification timeframe for compliance checking for latent errors has been completed. Processing for an affirmative determination at decision point 428 that the verification timeframe has been completed will be deferred and described in more detail below. As such, when a determination is made at decision point 428 that the verification timeframe has not been completed, the process 400 returns to block 424 to continue monitoring for latent errors and iterates as described above.

Returning to the description of decision point 420 and the description of decision point 426, when a determination has been made at either decision point 420 or 426 that either an immediate error or a latent error has been detected, respectively, the process 400 automatically creates a child error report at block 430. At block 432, the process 400 correlates the child error report with the parent change management task that caused the error. Correlation of the child error report with the parent change management task may be performed by creating a child correlation identifier and associating that child correlation identifier with each child error report created. This child correlation identifier may be used and further associated with the change correlation identifier associated with each parent task to refer hierarchically to the original service request received.

At decision point 434, the process 400 makes a determination as to whether the error was the result of an automation error. When a determination is made that the error was the result of an automation error, the process 400 indicates that the error was caused by automated implementation of the change management task at block 436. When a determination is made that the error was not caused by automation processing, or upon completion of indicating that the error was caused by automated implementation processing at block 436, the process 400 returns to block 404 and iterates as described above to perform automated implementation of child change management tasks and child implementation verification polices and processes, as described above, for each child change management task created for each child error report that was created at block 430.

As such, the process 400 may define a strategy for automated implementation of processing for each child error report at block 404. The process may further partition the automated implementation strategy for each child error report into child change management tasks at block 406 in response to the detected error. At block 408, the process 400 may create a child identifier for each child change management task. And at block 410, the process 400 may define a child implementation verification policy for each child change management task. Each child change management task may be automatically implemented as described above and monitored based upon the child implementation verification policy. Accordingly, the process 400 recursively processes errors generated during automated implementation of service requests, hierarchically tracks child error reports, and automatically implements child change management tasks for each identified error.

The process 400 may further detect child task implementation errors associated with automated implementation of child change management tasks based upon the child implementation verification policy and may automatically correlate a child task implementation error with the service request that caused the error. This automated correlation may be performed using the child correlation identifier and a parent correlation identifier that associates the parent change management task with the original service request. Based on the processing, the process 400 recursively implements additional change management tasks in response to additional errors associated with the service request that caused the error. The process 400 automatically correlates the additional errors with the original service request that caused the error using the hierarchical child correlation identifiers that associate each of the additional child change management task with its associated parent change management task and a parent correlation identifier that associates the parent change management task with the original service request.

Returning to the description of decision point 428, when a determination is made that the verification timeframe has been completed, the process 400 transitions to the processing shown and described in association with FIG. 4B.

FIG. 4B illustrates additional processing associated with the process 400 for automated processing of service requests for information technology error and service request correlation. At decision point 438, the process 400 makes a determination as to whether any errors were detected during automated implementation of the original service request. When a determination is made that at least one error was detected, the process 400 identifies the associated change management tasks with the implementation errors at block 440. At decision point 442, the process 400 makes a determination as to whether a child change management task corrected the identified error based upon a child implementation verification policy. When a determination is made at decision point 442 that the child change management task did correct the error based upon the child implementation verification policy, the process 400 provides an indication that the error detected in association with one of the change management tasks has been automatically corrected at block 444. When a determination is made at decision point 442 that a child change management task was unable to correct the error based upon the child implementation verification policy, the process 400 provides an indication that the error detected in association with the change management task has not been automatically corrected at block 446.

At block 448, the process 400 identifies any tasks without implementation errors. When a determination is made at decision point 438 that no errors were associated with the automated implementation of any change management tasks, or upon identifying any tasks without automated implementation errors at block 448, the process 400 provides an indication of any change management tasks that have been automatically implemented successfully at block 450. As such, process 400 verifies proper automated implementation of change management tasks using the implementation verification policy created for each change management task and identifies any errors that have been automatically corrected or that have not been automatically corrected by automated implementation of child change management tasks. The process 400 returns to the processing described in association with FIG. 4A and returns to decision point 402 to await a new service request.

As such, the process 400 recursively defines automated implementation strategies and change management tasks for automated implementation of service requests. Automated implementation is verified using automatically defined implementation verification policies for each change management task. The implemented verification policies may include verification timeframes for each task to identify latent implementation errors. Errors that are identified during automated implementation are also automatically processed by the creation of child error reports and child change management tasks. The process 400 recursively processes all errors and identifies whether child change management tasks have automatically corrected any identified errors. The process 400 also identifies change management tasks that have been successfully implemented.

As described above in association with FIG. 1 through FIG. 4B, the example systems and processes provide automated information technology error and service request correlation. Many other variations and additional activities associated with automated information technology error and service request correlation are possible and all are considered within the scope of the present subject matter.

Those skilled in the art will recognize, upon consideration of the above teachings, that certain of the above examples are based upon use of a programmed processor, such as the CPU 200. However, the invention is not limited to such example embodiments, since other embodiments could be implemented using hardware component equivalents such as special purpose hardware and/or dedicated processors. Similarly, general purpose computers, microprocessor based computers, micro-controllers, optical computers, analog computers, dedicated processors, application specific circuits and/or dedicated hard wired logic may be used to construct alternative equivalent embodiments.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable storage medium that can direct a computer or other programmable data processing apparatus to function in a particular manner, such that the instructions stored in the computer-readable storage medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modems and Ethernet cards are just a few of the currently available types of network adapters.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method, comprising:
    creating, via a configuration management device in response to receipt of each one of a plurality of service requests within an information technology (IT) environment, an implementation verification policy for each of a plurality of change management tasks, where each plurality of change management tasks represents a partitioning of the respective one of the plurality of service requests into changes to be implemented within the information technology (IT) environment responsive to the respective one of the plurality of service requests;
    automatically implementing each of the plurality of change management tasks;
    detecting an error associated with the automated implementation of one of the plurality of change management tasks based on a violation of the implementation verification policy created for the one of the plurality of change management tasks; and
    automatically correlating the error with a service request that caused the error.

2. The method of claim 1, further comprising determining whether the error was caused by the automated implementation of the one of the plurality of change management tasks.

3. The method of claim 1, further comprising:
    associating a change correlation identifier with each of the plurality of change management tasks that identifies which of the plurality of service requests that each of the plurality of change management task is associated with; and
    where automatically correlating the error with the service request that caused the error comprises automatically correlating the error with the service request that caused the error using the associated change correlation identifier.

4. The method of claim 1, where each implementation verification policy comprises a verification timeframe based upon a configured verification duration for latent errors, and further comprising:
    monitoring the automated implementation of each of the plurality of change management tasks for a latent error; and
    where detecting the error associated with the automated implementation of one of the plurality of change management tasks based on the violation of the implementation verification policy created for the one of the plurality of change management tasks comprises detecting the latent error.

5. The method of claim 1, further comprising:
    automatically creating an error report ticket and a child change management task in response to detecting the error associated with the automated implementation of the one of the plurality of change management tasks;
    automatically correlating the one of the plurality of change management tasks as a parent change management task to the child change management task;
    creating a child implementation verification policy for the child change management task;
    automatically implementing the child change management task; and
    monitoring the automated implementation of the child change management task.

6. The method of claim 5, where automatically correlating the one of the plurality of change management tasks as the parent change management task to the child change management task comprises associating a child correlation identifier with the child change management task that identifies the parent change management task, and further comprising:
    detecting a child task implementation error associated with the automated implementation of the child change management task based on a violation of the child implementation verification policy; and
    automatically correlating the child task implementation error with the service request that caused the error using the child correlation identifier and a parent correlation identifier that associates the parent change management task with the service request.

7. The method of claim 5, further comprising:
    recursively implementing additional child change management tasks in response to additional errors associated with the service request that caused the error; and automatically correlating the additional errors with the service request that caused the error using a child correlation identifier that associates each of the additional child change management tasks with the parent change management task and a parent correlation identifier that associates the parent change management task with the service request.

8. The method of claim 5, further comprising:
determining that the child change management task corrected the error associated with the automated implementation of the one of the plurality of change management tasks based upon the child implementation verification policy; and
providing an indication that the error associated with the automated implementation of the one of the plurality of change management tasks has been automatically corrected.

9. A system, comprising:
a memory for storing automated implementation information; and
a processor programmed to:
create, in response to receipt of each one of a plurality of service requests within an information technology (IT) environment, an implementation verification policy for each of a plurality of change management tasks, where each plurality of change management tasks represents a partitioning of the respective one of the plurality of service requests into changes to be implemented within the information technology (IT) environment responsive to the respective one of the plurality of service requests;
store the implementation verification policy to the memory;
automatically implement each of the plurality of change management tasks;
detect an error associated with the automated implementation of one of the plurality of change management tasks based on a violation of the implementation verification policy created for the one of the plurality of change management tasks; and
automatically correlate the error with a service request that caused the error.

10. The system of claim 9, where the processor is further programmed to determine whether the error was caused by the automated implementation of the one of the plurality of change management tasks.

11. The system of claim 9, where the processor is further programmed to:
associate a change correlation identifier with each of the plurality of change management tasks that identifies which of the plurality of service requests that each of the plurality of change management task is associated with; and
where, in being programmed to automatically correlate the error with the service request that caused the error, the processor is programmed to automatically correlate the error with the service request that caused the error using the associated change correlation identifier.

12. The system of claim 9, where each implementation verification policy comprises a verification timeframe based upon a configured verification duration for latent errors, and where the processor is further programmed to:
monitor the automated implementation of each of the plurality of change management tasks for a latent error; and
where, in being programmed to detect the error associated with the automated implementation of one of the plurality of change management tasks based on the violation of the implementation verification policy created for the one of the plurality of change management tasks, the processor is programmed to detect the latent error.

13. The system of claim 9, where the processor is further programmed to:
automatically create an error report ticket and a child change management task in response to being programmed to detect the error associated with the automated implementation of the one of the plurality of change management tasks;
automatically correlate the one of the plurality of change management tasks as a parent change management task to the child change management task;
create a child implementation verification policy for the child change management task;
automatically implement the child change management task; and
monitor the automated implementation of the child change management task.

14. The system of claim 13, where, in being programmed to automatically correlate the one of the plurality of change management tasks as the parent change management task to the child change management task, the processor is programmed to associate a child correlation identifier with the child change management task that identifies the parent change management task, and the processor is further programmed to:
detect a child task implementation error associated with the automated implementation of the child change management task based on a violation of the child implementation verification policy; and
automatically correlate the child task implementation error with the service request that caused the error using the child correlation identifier and a parent correlation identifier that associates the parent change management task with the service request.

15. The system of claim 13, where the processor is further programmed to:
recursively implement additional child change management tasks in response to additional errors associated with the service request that caused the error; and
automatically correlate the additional errors with the service request that caused the error using a child correlation identifier that associates each of the additional child change management tasks with the parent change management task and a parent correlation identifier that associates the parent change management task with the service request.

16. The system of claim 13, where the processor is further programmed to:
determine that the child change management task corrected the error associated with the automated implementation of the one of the plurality of change management tasks based upon the child implementation verification policy; and
provide an indication that the error associated with the automated implementation of the one of the plurality of change management tasks has been automatically corrected.

17. A computer program product comprising a computer readable storage medium including computer readable program code, where the computer readable program code when executed on a computer causes the computer to:
create, in response to receipt of each one of a plurality of service requests within an information technology (IT) environment, an implementation verification policy for each of a plurality of change management tasks, where each plurality of change management tasks represents a partitioning of the respective one of the plurality of service requests into changes to be implemented within the information technology (IT) environment responsive to the respective one of the plurality of service requests;
automatically implement each of the plurality of change management tasks;
detect an error associated with the automated implementation of one of the plurality of change management tasks based on a violation of the implementation verification policy created for the one of the plurality of change management tasks; and
automatically correlate the error with a service request that caused the error.

18. The computer program product of claim 17, where the computer readable program code when executed on the computer further causes the computer to determine whether the error was caused by the automated implementation of the one of the plurality of change management tasks.

19. The computer program product of claim 17, where the computer readable program code when executed on the computer further causes the computer to:
associate a change correlation identifier with each of the plurality of change management tasks that identifies which of the plurality of service requests that each of the plurality of change management task is associated with; and
where, in causing the computer to automatically correlate the error with the service request that caused the error, the computer readable program code when executed on the computer causes the computer to automatically correlate the error with the service request that caused the error using the associated change correlation identifier.

20. The computer program product of claim 17, where each implementation verification policy comprises a verification timeframe based upon a configured verification duration for latent errors, and where the computer readable program code when executed on the computer further causes the computer to:
monitor the automated implementation of each of the plurality of change management tasks for a latent error; and
where, in causing the computer to detect the error associated with the automated implementation of one of the plurality of change management tasks based on the violation of the implementation verification policy created for the one of the plurality of change management tasks, the computer readable program code when executed on the computer causes the computer to detect the latent error.

21. The computer program product of claim 17, where the computer readable program code when executed on the computer further causes the computer to:
automatically create an error report ticket and a child change management task in response to detecting the error associated with the automated implementation of the one of the plurality of change management tasks;
automatically correlate the one of the plurality of change management tasks as a parent change management task to the child change management task;
create a child implementation verification policy for the child change management task;
automatically implement the child change management task; and
monitor the automated implementation of the child change management task.

22. The computer program product of claim 21, where, in causing the computer to automatically correlate the one of the plurality of change management tasks as the parent change management task to the child change management task, the computer readable program code when executed on the computer causes the computer to associate a child correlation identifier with the child change management task that identifies the parent change management task, and where the computer readable program code when executed on the computer further causes the computer to:
detect a child task implementation error associated with the automated implementation of the child change management task based on a violation of the child implementation verification policy; and
automatically correlate the child task implementation error with the service request that caused the error using the child correlation identifier and a parent correlation identifier that associates the parent change management task with the service request.

23. The computer program product of claim 21, where the computer readable program code when executed on the computer further causes the computer to:
recursively implement additional child change management tasks in response to additional errors associated with the service request that caused the error; and
automatically correlate the additional errors with the service request that caused the error using a child correlation identifier that associates each of the additional child change management tasks with the parent change management task and a parent correlation identifier that associates the parent change management task with the service request.

24. The computer program product of claim 21, where the computer readable program code when executed on the computer further causes the computer to:
determine that the child change management task corrected the error associated with the automated implementation of the one of the plurality of change management tasks based upon the child implementation verification policy; and
provide an indication that the error associated with the automated implementation of the one of the plurality of change management tasks has been automatically corrected.

* * * * *